United States Patent [19]

Shimizu et al.

[11] 4,430,776
[45] Feb. 14, 1984

[54] COMBINATION VIBRATION DAMPER AND FASTENER FOR UNION OF TWO PANELS

[75] Inventors: Yoshitaka Shimizu, Higashi-Osaka; Norio Takahashi, Ibaraki, both of Japan

[73] Assignees: Matsushita Reiki Co., Ltd., Osaka; Nifco Inc., Yokohama, both of Japan

[21] Appl. No.: 296,530

[22] Filed: Aug. 26, 1981

[30] Foreign Application Priority Data

Sep. 8, 1980 [JP] Japan .................. 55-126574

[51] Int. Cl.³ .............. A44B 17/00; H01B 17/00; F16F 7/00
[52] U.S. Cl. .................. 24/573; 174/138 D; 267/141; 46/23; 24/287
[58] Field of Search .......... 24/213 R, 213 B, 214, 24/213 CS; 285/DIG. 22, 238, 305; 248/562, 220.3, 220.4, 221.1, 221.2; 46/26, 23, 29, 31; 174/138 D, 138 G; 411/349, 350, 508, 510, 548; 267/141

[56] References Cited

U.S. PATENT DOCUMENTS 2,758,498  8/1956  Johnson .................. 411/508
3,319,918  5/1967  Rapata .................... 267/141
4,159,592  7/1979  Gabriel .................... 46/29
4,247,136  1/1981  Fouss et al. ........... 285/DIG. 22

FOREIGN PATENT DOCUMENTS 567831   6/1958  Belgium ................. 267/141
1006613  3/1977  Canada ................. 174/138 D Primary Examiner—Gene Mancene
Assistant Examiner—James R. Hakomaki
Attorney, Agent, or Firm—Trexler, Bushnell & Wolters, Ltd.

[57] ABSTRACT

A combination vibration damper and fastener comprises head portions of the shape of a suction disc opposed back to back to each other across a space and adapted to collide with two separate panels, shanks extended in opposite directions from the head portions and provided with engaging means, damper pieces extended aslant from the head portions so as to be opposed to each other, and a connecting piece serving to connect the two head portions to each other. Insertion of the opposite shanks into the fitting holes bored in advance in the two panels fastens the two panels as separated by a fixed distance from each other. Vibration arising in one of the panels is absorbed by the damper pieces and prevented from reaching the other panel.

2 Claims, 6 Drawing Figures

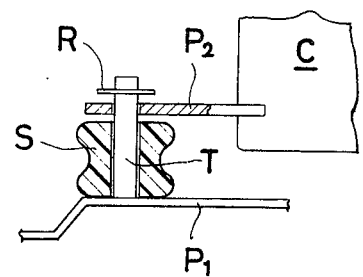
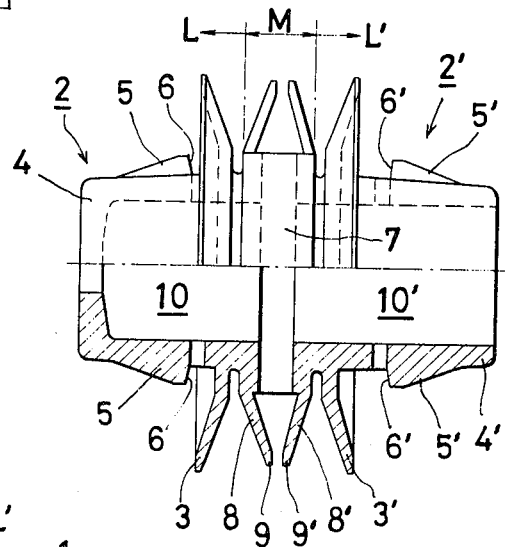
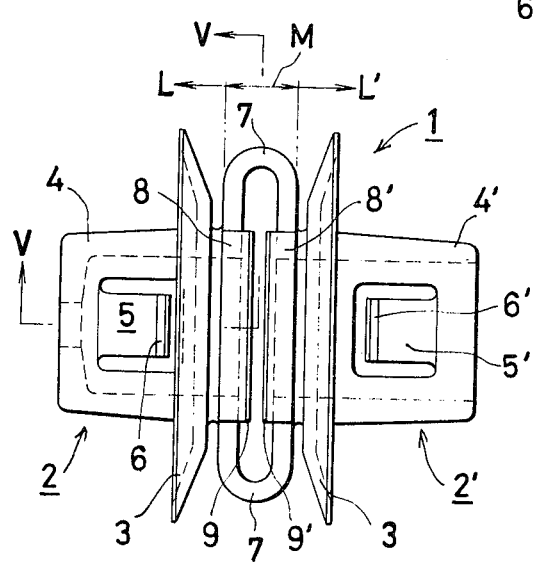

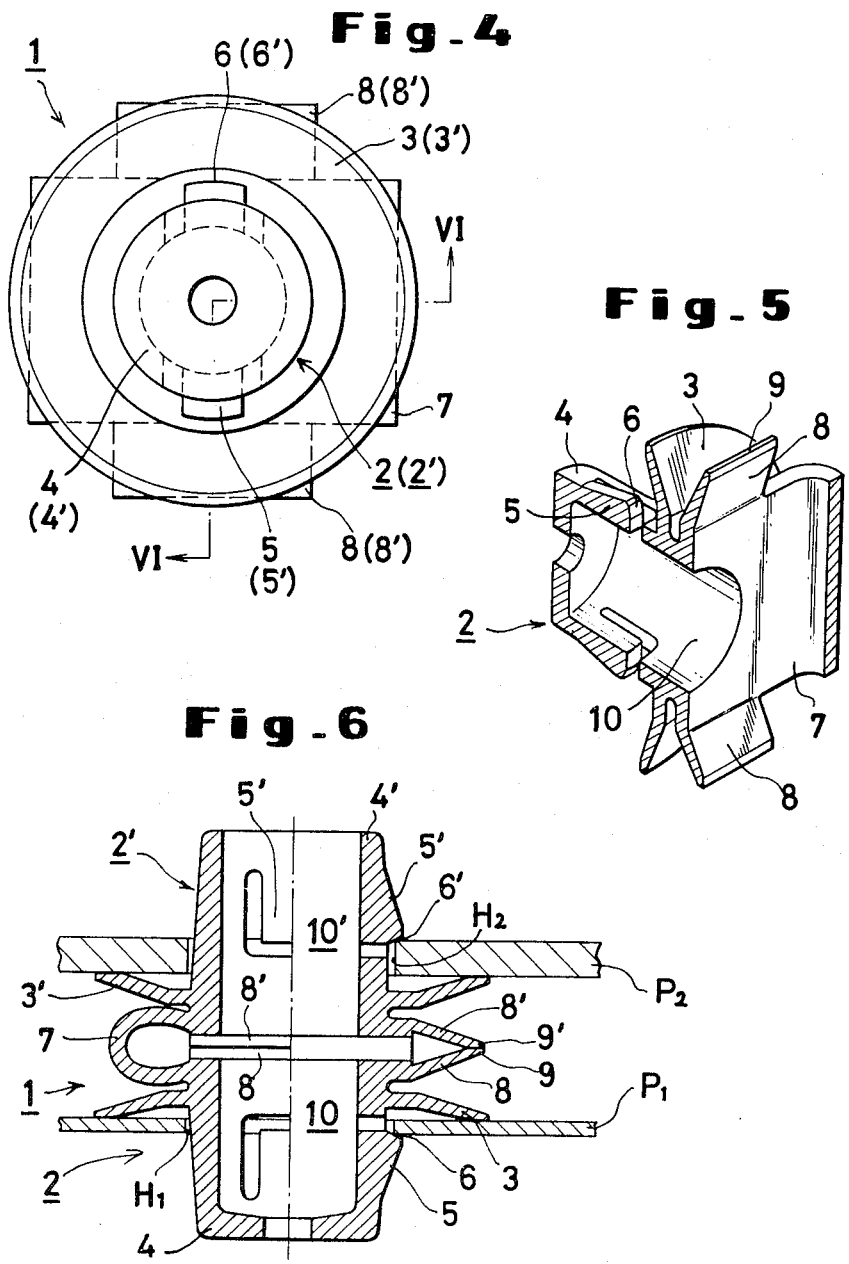

COMBINATION VIBRATION DAMPER AND FASTENER FOR UNION OF TWO PANELS

BACKGROUND OF THE INVENTION

This invention relates to a combination vibration damper and fastener for use in the union of two panels. Generally, it occurs at times that while two panels are required to be fastened to each other as separated by a fixed distance from each other, they are nevertheless desired to be mutually isolated in the sense that any mechanical vibration caused on one of the two panels will not be transferred to the other panel. The necessity of this nature arises where a compressor for a refrigerator is fastened to the bottom panel of the refrigerator body, for example.

The convention adopted for such applications comprises the steps of planting support pins on the bottom panel of the refrigerator body as by welding, fitting rubber sleeves as damper means around the support pins, further setting on the rubber sleeves fitting ear pieces containing perforations for attachment of the compressor, and fastening E-rings onto the ear pieces thereby permitting fast union of the compressor to the bottom panel through the medium of the rubber sleeves. Thus, the conventional methods and devices have inevitably entailed welding works and other troublesome fitting work and have further suffered from a disadvantage that the devices are expensive because of their inevitable use of many component parts.

Among the jobs involved, there are included some, such as welding work, which require skilled workers. Even the work of fitting E-rings turns out to be an unexpectedly troublesome job. Thus, it makes it impossible to use inexperienced workers and requires skilled workers instead.

Despite the highly troublesome work so entailed, the devices have to rely for damper function solely upon the rubber sleeves. The conventional devices, therefore, have offered no ample design freedom in the optimization of the amount of damping.

SUMMARY OF THE INVENTION

An object of this invention is to provide a combination vibration damper and fastener which consists of just one part and which can be used simply and quickly by any person, skilled or unskilled, to fasten two panels to each other and, at the same time, impart damping function to the joined panels.

To accomplish the object described above according to the present invention, there is provided a combination vibration damper and fastener for use in the union of two panels, which comprises symmetrically opposed head portions each provided with a damper piece extended radially and possessed of resiliency in the axial direction, shanks extended from the opposed head portions in the opposite directions and provided on the outer surfaces thereof with engaging claws, and a resilient connecting piece serving to connect the two head portions to each other.

Union of two given panels is accomplished by first forming fitting holes at the corresponding positions in the two panels and then causing the shanks of the fastener of this invention mentioned above to be inserted into the fitting holes and brought into fast engagement with the edges of the holes. Since the two panels are held fast to each other and yet separated by the damper pieces of the head portions of the combination damper and fastener, vibration arising in one of the panels is absorbed by the resiliency of the damper pieces and, therefore, is prevented from being transferred to the other panel. The use of this device of the present invention is effected by the simple work of inserting the shanks of the device into the fitting holes of the panels. This work neither calls for any special skill nor consumes much time.

The other objects and characteristics of this invention will become apparent from the further disclosure of the invention to be made hereinafter with reference to the accompanying drawings.

BRIEF DESCRIPTION OF THE DRAWINGS

FIG. 1 is a schematic structural diagram of a typical conventional damper device.

FIGS. 2 and 3 are side views of one embodiment of this invention taken in two directions intersecting each other at right angles.

FIG. 4 is a front view of the same embodiment taken in one axial direction.

FIG. 5 is a perspective view of the important part as sectioned along the line V—V of the diagram of FIG. 3.

FIG. 6 is a longitudinally sectioned view of the embodiment as used in the union of two panels, taken along the line VI—VI of the diagram of FIG. 4.

DESCRIPTION OF THE PREFERRED EMBODIMENT

This invention relates to a combination vibration damper and fastener for use in the union of two panels, which enables the two panels to be fastened as separated at a fixed distance by a simple operation and which imparts effective damper function to the joined panels.

FIG. 1 illustrates a typical conventional combination vibration damper and fastener as used in the installation in a refrigerator body of a machine such as a compressor incorporating a source of vibration. To the bottom panel $P_1$ as the first of the two panels being fastened, a support pin T is planted in advance as by welding. Then, a rubber sleeve S as the damper is fitted around the support pin T. A perforation in a fitting ear piece $P_2$ which is stationarily provided as the second panel on the compressor C is passed down over the pin T. Over the perforation, an E-ring R is fitted to the pin T. In this manner, the two panels $P_1$, $P_2$ and consequently the compressor C and the bottom panel $P_1$ are fastened. In the illustrated embodiment, just one place of the union by use of the fastener is shown. Generally, it is only natural that this union should occur at a plurality of points such as the four corners of the compressor. This means that the troublesome work of fastening as described above must be performed at each of the plurality of points. The conventional device, therefore, has entailed the disadvantage that if offers very poor workability and involves a large number of parts.

The installation of the compressor to the refrigerator body is not the sole use found for the fasteners of this kind. The fasteners find utility in all the applications in which vibration sources are fastened to first panels $P_1$ through the medium of second panels $P_2$ such as fitting pieces. Thus, all the uses found for the fasteners of this kind can be generalized as the relation between the two panels $P_1$, $P_2$. In the description of the embodiment of this invention to be made herein with reference to the accompanying drawing, therefore, the first and second panels $P_1$, $P_2$ alone are shown as objects for mutual union.

In FIGS. 2 and 3, the side views of the device 1 of this invention as taken in two different directions intersecting each other at right angles are illustrated. This device 1 is a one-piece and one-part object wholly injection molded from a suitable plastic material.

This device 1 is provided with a pair of fastener portions 2, 2' opposed back to back to each other and adapted to be snapped into fast engagement with the fitting holes $H_1$, $H_2$ (shown in FIG. 6) formed in advance in a pair of panels $P_1$, $P_2$. In the diagrams of FIGS. 2 and 3, the portion roughly to the left of the chain line L constitutes the fastener portion 2 for engagement with the first panel $P_1$ and the portion roughly to the right of the chain line L' the fastener portion 2' for engagement with the second panel $P_2$. And the zone M intervening between the two chain lines L, L' constitutes a connection and damper function portion for the two fastener portions 2, 2' as will be described more fully afterward.

The pair of fastener portions 2, 2' which are axially aligned and opposed back to back to each other can be designed in varying sizes freely selected to suit the thicknesses of the panels $P_1$, $P_2$ and the diameters of the fitting holes formed therein. Despite such dimensional variations, the fastener portions have an invariable structure. The description which is given below, therefore, is applicable to all the embodiments contemplated by this invention.

The fastener portions 2, 2' taken independently may be the same as those of known plastic fasteners (called plastic rivets or clips). From a variety of fasteners of this kind known to the art, those of suitable structure may be adopted. In the illustrated embodiment, the fastener portions 2, 2' are in the structure of the so-called anchor type fasteners. To be more specific, they possess head portions 3, 3' and leg portions or shanks 4, 4' which have a diameter smaller than the diameter of the head portions and extend from the head portions.

From the outer surfaces of these shanks 4, 4', at least one or, in the illustrated embodiment, two diametrically opposite resilient pieces or anchor claws 5 are radially extended outwardly toward the lower sides of the head portions. The leading ends 6, 6' of the anchor claws are rendered flexible both inwardly and outwardly in the radial directions. The anchor claws are formed in dimensions such that their leading ends extend beyond the edges of the corresponding fitting holes $H_1$, $H_2$ and maintain distances equal to or slightly smaller than the thicknesses of the corresponding panels $P_1$, $P_2$ from the lower sides of the head portions. Particularly, the head portions 3, 3' of the fastener portions 2, 2' as used in the illustrated embodiment have the shape of a suction disc to improve the allowance for variations in the thicknesses of panels and provide additional damper function, though to a slight extent.

In line with the structure of the fastener portions 2, 2' described above, the device has the head portions 3, 3' opposed to each other in the axial direction and uses a connecting piece 7 possessing resiliency in the axial direction and serving to connect the head portions as held in the opposed state. The connecting piece in this embodiment possesses U-shaped edges as noted from the side view of FIG. 3. The opposite ends of the U-shaped edges have a shape appearing to be integrally joined with the head portions 3, 3'. From the front side, the connecting piece appears to be a plate of a large width as shown in FIG. 4. Preferably, there are provided two such connecting pieces disposed in two perpendicularly intersecting directions as shown in the same diagram.

In addition to the connecting piece 7, the head portions 3, 3' are provided with opposed damper pieces 8, 8' disposed in the peripheral directions in which the connecting piece 7 is absent. In the illustrated embodiment, the damper pieces are platelike pieces possessed of resiliency in the axial direction and extended aslant toward each other from the head portions 3, 3'. In the illustrated embodiment, there are disposed two damper pieces one each at the two diametrically opposite positions.

Particularly, in the present embodiment, the damper pieces 8, 8' whose leading ends are closely opposed to each other as illustrated in FIGS. 2 and 3 are formed in dimensions such that the leading ends 9, 9' thereof are separated from each other in the axial direction when the resilient connecting piece 7 remains in its natural state under no stress. In other words, the resilient connecting piece 7 is deformed and the leading ends 9, 9' of the damper pieces 8, 8' are caused to come into mutual contact only when the two fastener portions 2, 2' are exposed to a force exerted in the direction causing the two fastener portions approach to each other. The reason for this particular arrangement is that when the combination damper and fastener is integrally molded by injection of a plastic material, the presence of a gap between the dampers 8, 8' permits the injection molding to be effected simply with an ordinary slider mold die.

FIG. 5 represents a perspective view of the device in a cross section taken along the line V—V of the diagram of FIG. 3. This diagram facilitates understanding of the shape of each component. Generally the shanks 4 of the fastener portions contain empty spaces 10, 10' for the purpose of enabling the anchor claws 5 to be bent down inwardly and of reducing the consumption of material and affording convenience in the fabrication of the mold die.

Now, the fitting work involved in fastening the panels $P_1$, $P_2$ with the device 1 of the present embodiment constructed as described above, and the operation and the effect of the present invention in the union of the panels will be described with reference to FIG. 6. In FIG. 6, the device is illustrated in the sections taken along the line VI—VI in the diagram of FIG. 4, so that the resilient connecting piece 7 and the damper pieces 8, 8' show at the same time.

The first step is to fasten the fastener portion 2 to the first panel $P_1$.

This is the general convention applicable to any fastener of this type. The fastener portion 2 is pushed in the fitting hole $H_1$ of the first panel in the direction of the leading end of the shank 4. At first, the anchor claw 5 slides on the edge of the hole while being bent down inwardly. When the leading end of the anchor claw rides over the edge of the hole, the anchor claw 5 as a whole regains its original shape by virtue of its own resiliency, with the result that the leading end 6 and the lower side of the head portion 3 nip the first panel $P_1$. This completes the fast attachment of the fastener portion 2 to the panel $P_1$. Since the head portion 3 has the shape of a suction disc as already pointed out, it offers some allowance for the change in the thickness of the panel $P_1$. Besides, the resiliency which the head portion of the shape of a suction disc manifests on the panel lends itself to the enhancement of the strength with which the fastener portion 2 is fixed to the panel $P_1$.

After the device 1 has been planted in the first panel $P_1$ by means of the fastener portion 2 as described above, the second panel $P_2$ is fastened to the device 1 by causing the fitting hole $H_2$ of the second panel $P_2$ to be pushed down around the other fastener portion 2' by the same fastener function.

Consequently, the work of joining the first and second panels $P_1$, $P_2$ is completed as illustrated in FIG. 6. This union of the two panels by the device 1 gives birth to the damper function.

Owing to the weight of the panel $P_2$ itself or the weight of the vibration source which is fastened to the panel $P_2$ as in the compressor dealt with previously, the device 1 is exposed to the force tending to press the upper fastener portion 2' in the axial direction against the lower fastener portion 2. As a result, the resilient connecting piece 7 is deformed in the axial direction and the leading ends 9, 9' of the pair of damper pieces 8, 8' are brought into mutual contact and pressed against each other. This pressure all the more enhances the mutual resiliency in the axial direction.

When vibration arises in the second panel $P_2$, it is absorbed by the resiliency of the damper pieces 8, 8'. Thus, the vibration is now allowed to advance from the lower fastener portion 2 to the first panel $P_1$. To be more specific, particularly in the case of the present embodiment, the relation of contact established between the pair of damper pieces 8, 8' which are pressed against each other in the axial direction even to the extent of causing slight flection is such that it provides ample absorption of the components of basic wave and high-pitch wave of the frequency of the vibration caused by a vibration source such as a compressor, for example, and enables the resilient connecting piece 7 bent under the conditions of use of manifest the damper function of some form or other and absorb transient or heavy shocks. Of course, the strength of the resilient connecting piece 7 can be freely selected at the time of design to suit the weight of the panel $P_2$, the amount of damping required, and so on. Further, the amount of damping can be fixed also by the length of the extension of the damper pieces, the distance of the flection in the axial direction, the length of mutual contact, the strength of material used, etc.

Where the inconvenience experienced in the fabrication does not matter, the device 1 can be molded in such a manner that the two damper pieces 8, 8' remain in contact with each other from the beginning. In this case, the damper pieces may be made to function as resilient connecting pieces for connecting the two fastener pieces 2, 2'.

When the resilient connecting piece and the damper pieces are formed as independent components as illustrated, their numbers and their positions can be freely selected and their shapes are also selected freely. When the fastener head portions 3 have the shape of a suction disc, they can be expected to offer the damper function. This does not necessarily imply that their shape must be limited to the suction disc. They may be flat, for example.

Although the fastener portions in the illustrated embodiment are of the snap-in type resorting to the simple work of pushing, there may be otherwise used fastener portions of the so-called bayonet-mount type. In that case, the resilient pieces or the anchor claws have to function as stationary pieces. Thus, they are to be collectively regarded as engaging pieces.

As described above, the present invention provides a one-piece combination vibration damper and fastener for use in the union of two panels. The attachment of this device is accomplished by the very simple, easy work of causing the opposite fastener portions to be attached to the corresponding panels. It can be used effectively by any person, skilled or unskilled. If the union of two panels requires use of a number of devices of this invention at different positions, the fastening can be effected without taking up much time. In addition to the low cost of the device itself, the present invention enjoys a highly beneficial effect of contributing greatly to reducing the cost of final products manufactured by use of the device.

What is claimed is:

1. A combination vibration damper and fastener for use in the union of two panels, comprising in combination a pair of plastic fastener portions opposed back to back to each other across a space in the axial direction, said fastener portions each being composed of a head portion, a shank extended downwardly from said head portion, and an engaging piece provided on the outer surface of said shank and extended radially outwardly therefrom and toward the head portion to provide a surface for engagement with a panel being fastened, a plurality of arcuately spaced substantially U-shaped resilient connecting pieces manifesting resiliency in the axial direction and serving to connect the opposed head portions to each other, a pair of vibration damper pieces extended in the radial direction from each head portion and manifesting resiliency in the axial direction, there being a plurality of arcuately spaced vibration damper pieces on each head portion substantially coplanar with and alternating with said connecting pieces, the leading ends of said damper pieces from the two head portions being opposed to each other, said damper pieces normally being axially spaced apart and movable into engagement upon loading of said damper, said damper pieces extended aslant from the fastener head portions so as to be opposed to each other and extending radially a substantial distance beyond said shank.

2. The combination vibration damper and fastener according to claim 1, wherein the fastener head portions have the shape of suction discs of greater diameter than said shank and are concave away from one another.

* * * * *